P. C. HEWITT.
VAPOR ELECTRIC APPARATUS.
APPLICATION FILED JUNE 5, 1908.
1,163,666.
Patented Dec. 14, 1915.
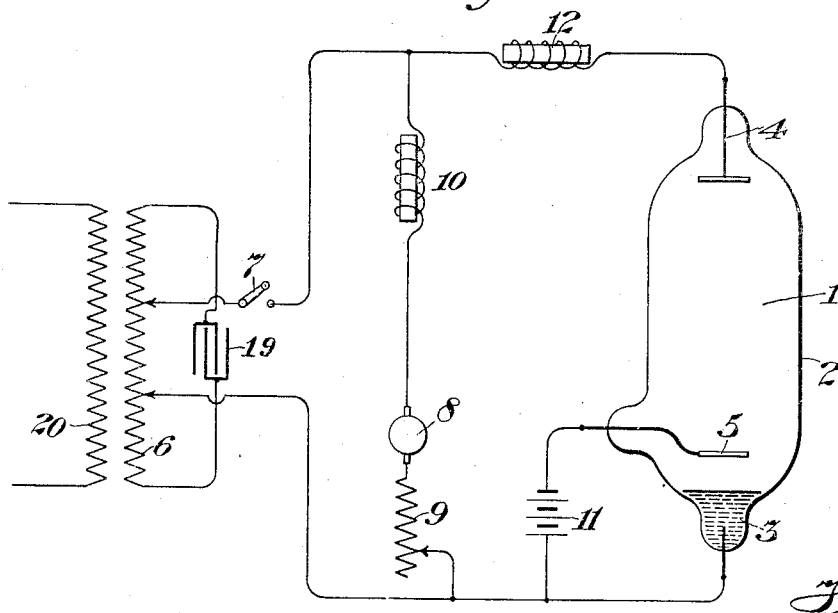
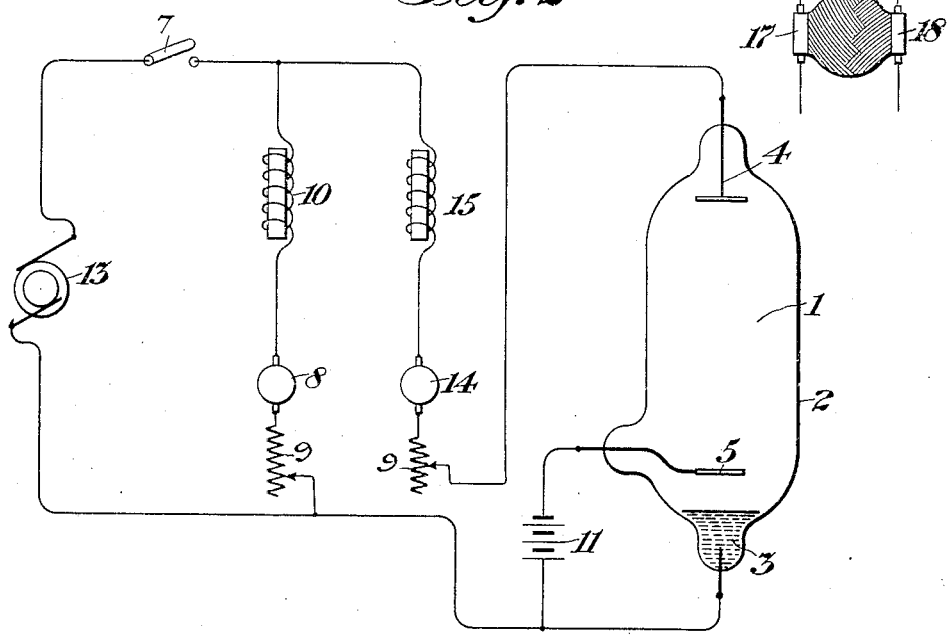
Witnesses:
Chas. F. Clagett
Thos. H. Brown
Inventor
Peter Casper Hewitt
By his Attorney
Charles A. Terry

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC APPARATUS.

1,163,666.  Specification of Letters Patent.  Patented Dec. 14, 1915.

Application filed June 5, 1908. Serial No. 436,771.

*To all whom it may concern:*

Be it known that I, PETER COOPER HEWITT, a citizen of the United States, and resident of Ringwood Manor, county of Passaic, State of New Jersey, have invented certain new and useful Improvements in Vapor Electric Apparatus, of which the following is a specification.

The present invention relates to a method of rectifying alternating currents characterized among various features by the utilization for the consumption of the rectified current of two or more receiving circuits, only one of which includes a rectifier. I may illustrate as one case in which my invention is particularly useful the rectification of energy transmitted by "ether waves" constituting rapidly alternating waves of electric energy such, for example, as are given out by the well known wireless telegraph transmitters. When the energy transmitted by such "ether waves" reaches any particular point, the amount of this energy may be said to be predetermined, that is, is definite and limited in its amount. In this it differs from the usual constant potential supply in which there is no definite limit to the amount of energy that may be withdrawn on demand from the supply.

In the present invention I use two receiving circuits and waves of one polarity are passed through one circuit while waves of the other polarity pass through the other circuit.

Means have been devised heretofore for utilizing both waves of an alternating supply, but my invention differs from previous inventions in that I use two receiving circuits and only one of the two receiving circuits contains a rectifier: further the rectifier is traversed by only one set of waves. In spite of this fact, however, both of these receiving circuits are traversed by unidirectional current and, if desired, both can be made to contribute to the same useful effect.

The effect of the above mentioned characteristic of the supply found, for example, in the "ether waves", namely that energy is available therefrom only in predetermined amounts will now be seen for, when the direction of the wave is such as to be favorable for traversing the one of the two receiving circuits containing the rectifier, the total available amount of energy can pass therethrough relatively freely, that is without producing any considerable rise of voltage therein. The second receiving circuit in view of the resistance to current flow that exists therein will receive a negligible amount of current from that series of waves which are in such a direction as to pass freely through the rectifier receiving circuit. On the other hand trains of waves which are directed in the opposite direction can not pass through the rectifier and the full potential behind the transmission of these waves is available for forcing the energy through the circuits not containing the rectifier. Thus the second receiving circuit is traversed substantially by waves of only one polarity. On the other hand were strictly constant potential maintained on the two receiving circuits, the same potential would be impressed during both sets of waves on the second receiving circuit since a sufficient amount of current would flow from the constant potential source through the rectifier receiving circuit, when the direction was favorable, to maintain full supply voltage on this circuit and consequently on the other receiving circuit. It will be thus seen that the characteristic by which only limited or predetermined amounts of energy are transmitted by the "ether waves" plays an important part in the operation of my invention. As an instance where this method is especially desirable I may mention the rectification of alternating energy delivered in predetermined amounts, as when derived from ether waves, rather than be derived directly from a constant potential source. It is applicable, however, under other conditions to constant potential sources and large volumes of current. The particular cases where it may be advantageously used can be determined from the characteristics here following.

The principle of the invention can best be understood from the description and operation of the circuits shown in the drawings, in which—

Figure 1 represents the operation of a direct current receiving circuit from a single-phase alternating source where the major part of the current in the work circuit does not pass through the rectifier. Fig. 2 shows a modification in which all current from the supply is utilized directly, though in separate work circuits. Fig. 3 shows a means for combining the effects of the two receiving circuits of Fig. 2.

Returning now to Fig. 1, 1 represents a vacuum rectifier comprising a hermetically sealed and completely exhausted container, 2, a vaporizable reconstructing cathode, 3, which may be of mercury, a solid main anode, 4, and a supplemental anode, 5. 6 represents the secondary of the transformer illustrating an alternating current source, its output being controlled by the switch 7. The direct current motor, 8, and adjustable resistance, 9, may be inserted when necessary to receive rectified current through the steadying coil 10. The battery, 11, one terminal of which is connected to the lead of the cathode, 3, feeds current into the supplemental anode, 5, and maintains the rectifier in operative condition. The regulating coil, 12, serves to steady the current flow in that branch of the parallel circuits containing the rectifier. The circuits are connected as follows: The primary, 20, receives energy transmitted by the "ether waves" and transfers this energy to the secondary 6. From one terminal of the secondary, 6, connection is made to the cathode 3, of the rectifier and to one terminal of the adjustable resistance 9. From this common point of connection two circuits exist in parallel, one containing the rectifier, 1, and an inductance, 12, in the lead of the positive electrode, 4, thereof, and the other circuit containing a motor, 8, connected to the other end of the adjustable resistance, 9, and to an inductance 10. The two inductances, 10 and 12, are connected together by their other leads and are connected through the switch, 7, to the other terminal of the transformer secondary 6. The operation of this Fig. 1 is as follows: During alternations when the secondary, 6, supplies electromotive force toward the switch, 7, current initially passes freely through the coil 12, the rectifier, 1, back to the other terminal of the source. The reverse alternation being unable to enter the anode, 4, on account of its negative electrode starting reluctance, passes through the adjustable resistance, 9, the motor, 8, the coil, 10, the switch, 7, back to the source. During these operations energy is stored in the coils, 12 and 10, so that after the establishing of operation the discharge from the coil, 12, will pass current through the adjustable resistance, 9, and the motor, 8, on the fall of current in this coil. The coil, 10, tends to maintain a smooth flow of current through the motor. It is evident that this system has the advantage that current passing directly through the work circuit from the source does not traverse the rectifier, 1, whence the voltage normally dissipated in such devices, may be utilized effectively. Furthermore, a considerable proportion of the energy passed in the alternate alternations through the coil, 12, is stored therein and a portion of this also is discharged through the work circuit. The battery, 11, keeps the rectifier alive by maintaining a constant flow of current through the cathode as is now well understood in the art. The vacuum rectifier here shown is, as follows from the description above, of the same type of apparatus as the so-called Cooper Hewitt mercury vapor lamp and converter. The number of effective turns of the secondary 6 may be varied by taking the leads from different points. Furthermore by suitably adjusting the condenser 19 to resonance an added amount of energy can be secured in the secondary 6.

With regard to the tuning of the circuit of the secondary transformer, 6, with the periodicity of the supply, advantage is obtained in the completeness of the extraction of energy therefrom in virtue of the high voltages and large currents built up in the resonating circuit.

Fig. 2 shows an organization of circuits somewhat similar to that of Fig. 1. The vacuum rectifier, 1, and its component parts, including the battery 11, or a substitute therefor, are similar to the corresponding parts as described for Fig. 1. The transformer secondary, 6, is replaced by the alternating current generator, 13. The motor, 8, is supplied with current through the inductance coil, 10, as shown in Fig. 1, while a second motor, 14, in series with the coil, 15, is included in the branch of the circuit leading to the rectifier, 1; otherwise, the connections are similar to those in Fig. 1, and the functions of the various parts similar thereto. In this figure energy from one alternation is stored largely by the coil, 10, when used, and motor, 8, and from the other alternation is stored largely by the motor, 14, and may be controlled by the coil, 15, when used. These functions of these coils may be dispensed with and performed by the motor or otherwise. Oftentimes, however, in virtue of the storage of energy by the two coils, or their equivalents, the supply to the motors, 8 and 14, respectively, will not be confined entirely to their natural supply alternations. It is, of course, understood that the switch, 7, and the adjustable resistance, 9, may be used in Fig. 2 as in Fig. 1. The resistance being placeable in series either with the motor, 8, or the motor, 14, or with both motors.

In the present invention I have found that oftentimes with relatively low voltages and small currents, a considerable advantage results from this connection. This result may perhaps be due to the ability to pass energy to the work circuit without traversing the rectifier, but I do not mean to limit my invention to that particular operation, for doubtless other factors are important in those cases where my system is superior to others.

Fig. 3 indicates a motor armature having two windings and separate commutators corresponding to those of motors, 8 and 14, in Fig. 2 combined. In this figure, 16, represents the armature body covered with the two windings 17 and 18 connected to separate commutators, which may be connected respectively in place of the commutators of the two motors 8 and 14 of Fig. 2. In other words by this arrangement the total energy available for rectification may be taken for some useful purpose on the same shaft, that is the shaft carrying the armature 16. One train of waves flows through the armature winding 17, and the other train of waves flows through the armature winding 18, these circuits being electrically the same as the circuits in the motor armature, 8, and the motor armature 14, of Fig. 2, respectively. The two windings 17 and 18, being mounted upon the same armature, jointly contribute to the common result. In applying the armature of Fig. 3 in the system of Fig. 2 it is obvious that the armature 14, and its corresponding winding are bodily replaced by the armature winding 18, while the motor, 8, and its armature winding, are bodily replaced by the armature winding 17, or vice versa. In each case there are the two independent receiving circuits, both traversed by rectified currents of opposite polarities, but, while the motors in Fig. 2 may operate mechanically independently, the motor windings in Fig. 3 must revolve physically together. Other mechanical or electrical methods of combining the effects of the two direct current receiving circuits may be utilized without departing from my invention.

I claim as my invention:—

In a system of electrical distribution, the combination with an alternating source having a plurality of trains of waves of predetermined energy content, two receiving circuits, a vapor electric rectifier comprising an exhausted container and a plurality of electrodes therein in one of said receiving circuits, and a resistance in the other receiving circuit, of energy utilizing and energy storing devices in each of said receiving circuits.

Signed at New York, in the county of New York and State of New York, this 1st day of June A. D. 1908.

PETER COOPER HEWITT.

Witnesses:
 WM. H. CAPEL,
 THOS. H. BROWN.